United States Patent Office 3,546,813
Patented Dec. 15, 1970

3,546,813
FUNGICIDAL COMPOSITIONS
Paul-Ernst Frohberger, Burscheid, Bezirk Dusseldorf, and Christian Wiegand, Scharbeutz, Germany, assignors to Farbenfabriken Bayer Aktiengesellschaft, Leverkusen, Germany, a corporation of Germany
No Drawing. Filed May 10, 1965, Ser. No. 454,680
Claims priority, application Germany, May 14, 1964,
F 42,880
Int. Cl. A01n 9/20, 7/00, 5/00
U.S. Cl. 47—57.6
29 Claims

ABSTRACT OF THE DISCLOSURE

Fungicidal methods and compositions utilizing 2-furyl-benzemidazole. Fungi are combatted in the soil, plants and seeds.

---

The present invention relates to particular fungicidal compositions and methods of using the same.

It is already known that 2-furyl-benzimidazole can be used for the antimycotic finishing of footwear of rubber or synthetic material (cf. German Pat. No. 1,117,000). The fungi against which such a finishing is directed are human-pathogenic foot fung, such as *Candida albicans*, *Trichophyton mentagrophytes* and *Mycrosporium gypseum*, which are very readily destroyed by fungicidal agents. The difficulties in the discovery of fungicidal finishing materials of this type thus do not consist in finding compounds with extremely high fungicidal power but rather compounds which, with only an average fungicidal power, exhibit a good thermal stability.

2-furyl-benzimidazole has, in fact, only moderate fungicidal effects but is heat resistant and withstands, for example, a thermal vulcanization without damage of the rubber or synthetic material into which the same incorporated.

It is also already known that mercury compounds, such as phenyl mercury acetate, ethyl mercury chloride and methoxyethyl mercury silicate, can be used for combating phytopathogenic fungi of the genus Fusarium which, in comparison with other fungi, can only be destroyed with extreme difficulty. The organic mercury compounds have been considered up to now the only fungicidal agents with which fungi of the genus Fusarium could be successfully controlled. Because of this special fungitoxic property, these organic mercury compounds are used in spite of the high mammalian toxicity attendant their use which must be tolerated, and which, of course, represents a great disadvantage in and of itself.

There exists an urgent practical and technical need, therefore, to find fungicidal agents which exhibit an especially high fungicidal power against fungi of the genus Fusarium but which have only a slight mammalian toxicity, which can be combined with other dressings or active agents without a mutually disadvantageous influence, and which have a good plant compatibility.

It is an object of the present invention to overcome the drawbacks previously encountered in connection with the combating of phytopathogenic fungi of the genus Fusarium, and to provide a fungicidal composition which will be particularly effective for combating such phytopathogenic fungi without the disadvantages of high mammalian toxicity attendant the use of previous fungicides for fungi of the genus Fusarium.

It is another object of the present invention to provide a fungicidal agent possessing not only an especial fungicidal power against fungi of the genus Fusarium but also one which possesses slight mammalian toxicity, and one which may be combined with other dressings or active agents without a mutually disadvantageous influence.

It is a further object of the present invention to provide such a formulation or composition containing a fungicide for the genus Fusarium which possesses good plant compatibility and good compatibility with other known dressings or active agents with which the same may be combined for a broader spectrum of use.

It is still another object of the present invention to provide a method of combating phytopathogenic fungi of the genus Fusarium by applying to such fungi and their habitat a fungicidal amount of a specific active agent useful for this purpose yet having only slight mammalian toxicity.

It is still another object of the present invention to provide 2-furyl-benzimidazole in fungicidal compositions with dispersible carrier vehicles and to provide methods of combating phytopathogenic fungi of the genus Fusarium which contemplate applying to such fungi and their habitat a fungicidal amount of 2-furyl-benzimidazole.

It is still another object of the present invention to provide a method of dressing seeds against phytopathogenic fungi of the genus Fusarium, which contemplates applying to such seeds as a seed dressing therefor a fungicidal amount of an active agent.

It is still another object of the present invention to provide as such seed dressing a fungicidal amount of 2-furyl-benzimidazole.

It is a further object of the present invention to provide plant seeds dressed with 2-furyl-benzimidazole alone or in admixture with a carrier vehicle, which may be used forthwith without fear of contamination by phytopathogenic fungi of the genus Fusarium.

Other and further objects of the present invention will become apparent from a study of the within specification and accompanying examples.

It has been found in accordance with the present invention that the known compound 2-furyl-benzimidazole of the formula:

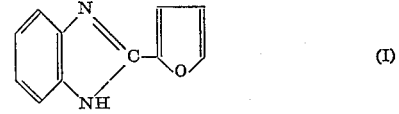

(I)

exhibits especially strong fungicidal properties against phytopathogenic fungi of the genus Fusarium, is very well tolerated by plants and, at the same time, can be combined with known seed dressing agents without mutually disadvantageous influence.

It is definely surprising that 2-furyl-benzimidazole, which, in general, possesses only a moderate fungicidal effect even against phytopathogenic fungi (cf. Examples 1, 2 and 3 hereinbelow which uses are not disclosed by the art), exhibits, with good compatibility with other dressings (cf. Examples 2 and 4 hereinbelow which uses are not disclosed by the art), an even stronger fungicidal effect against the particular phytopathogenic fungi of the genus Fusarium than the best previously known fungicides for combatting such Fusarium fungi, i.e., the above-noted organic mercury compounds (cf. Examples 4 and 5 hereinbelow). In addition, 2-furyl-benzimidazole is not phytotoxic and has a very low mammalian toxicity. The $LD_{50}$ is about 1000 mg. per kg. of rat per os. In contradistinction thereto, the $LD_{50}$ of organic mercury compounds, such as phenyl mercury acetate, ethyl mercury chloride and methoxyethyl mercury silicate, are between 30 and 90 mg. of active compound per kg. of rat per os. The difference in mammalian toxicity between such organic mercury compounds and 2-furyl-benzimidazole is extremely wide and therefore the discovery of the usefulness of the latter compound as a particular fungicidal agent represents a distinct advantage over the prior art compounds previously used for this purpose.

The use of 2-furyl-benzimidazole as agent for the antimycotic finishing of footwear, of course, in no way suggests the use of this compound as a funicidal agent for combatting phytopathogenic fungi of the genus Fusarium. This is true since, even though finishing agents must have a high stability to temperature and chemical influences, they need exhibit only a low fungicidal effect or power, as is the case with 2-furyl-benzimidazole due to their inherent manner of use and the purpose for their presence. In order to consider the use of 2-furyl-benzimidazole for combatting phytopathogenic fungi of the genus Fusarium, a great technical prejudice had to be overcome because it would have appeared to be pointless to utilize a compound of moderate fungical power against fungi which are extremely difficult to control fungicidally and which, according to the pertinent prior art, could only be destroyed by compounds having generally a strong toxicity even to humans.

Due to its extremely good fungicidal effect, as discovered in accordance with the present invention, 2-furyl-benzimidazole can be used as a seed dressing agent against phytopathogenic fungi of the genus Fusarium, such as *Fusarium nivale* and *Fusarium culmorum* and other Fusarium spec.

2-furyl-benzimidazole can be used as a pesticide alone or in admixture with solid or liquid carriers or diluents.

Thus, 2-furyl-benzimidazole according to the present invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins, (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamines, etc.), amides (for instance, dimethyl formamide, etc.), ketones for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, such 2-furylbenzimidazole according to the instant invention may be present in the formulations or compositions in the form of mixtures with other known active substances, if desired, and especially in the case of seed dressings, together with such other active compounds as hexachlorobenzene, hexachlorocyclohexane and pentachloronitrobenzene or in admixture with anthraquinone as a bird repellent.

In general, the compositions or formulations contain substantially between about 0.1 and 95% by weight of the active material, i.e., 2-furyl-benzimidazole, and preferably substantially between about 0.5 and 90% by weight.

2-furyl-benzimidazole may be employed by itself as the artisan will appreciate, in the form of compositions with solid or liquid dispersible carrier vehicles or other known compatible active agents, or in the form of particular dosage preparations for specific application made therefrom, such as solutions, emulsions, suspensions, powders, pastes, and granulates, which are thus ready for use, for example as wet dressings, dry dressings, dip dressings and slurry dressings for seeds or for direct application to the soil as desired.

The following examples are given for the purpose of illustrating, while not limiting, the present invention:

EXAMPLE 1

Agar plate test

To produce a suitable preparation of the active compound, the active compound is taken up in 100 times its amount of acetone.

The preparation of the active compound is added to potato-dextrose-agar which has been liquified by heating, in an amount sufficient to ensure that the desired concentration of active compound results. After thorough shaking to achieve a uniform dispersion of the active compound, the agar is poured into petri dishes under sterile conditions. When the mixture of substrate and active compound has solidified, test fungi from pure cultures are placed on it in small discs of 5 mm. diameter. The petri dishes are incubated for 3 days at 20° C.

After this time, the inhibiting action of the active compound on the mycelium growth is determined, taking into account the untreated control.

The active compounds, their concentrations, the test fungi and the inhibition effect achieved can be seen from Table 1 which follows:

TABLE 1.—AGAR PLATE TEST

| Active compound | Concentration of active compound in the substrate in mg./litre | Test fungi | Inhibition of mycelium growth |
|---|---|---|---|
| Untreated control | 0 | *Corticium rolfsii*<br>*Sclerotinia sclerotiorum*<br>*Verticillium alboatrum*<br>*Thielaviopsis basicola*<br>*Phytophthora cactorum* | No inhibition. |
|  | 1 | | |
| $C_2H_5$—Hg—Cl | 1 | *Corticium rolfsii*<br>*Sclerotinia sclerotiorum*<br>*Verticillium alboatrum*<br>*Thielaviopsis basicola*<br>*Phytophthora cactorum* | Complete inhibition. |
|  | 200 | | |

As will be seen from Table 1, a comparatively low concentration of the active compound does not inhibit mycelium growth and is thus more or less equivalent to the results with an untreated control. On the other hand, the results obtained with ethyl mercury chloride at a one unit concentration are completely satisfactory insofar as inhibition of mycelium growth is concerned. To attain such complete inhibition utilizing 2-furyl-benzimidazole actually requires a 200 fold quantity increase over that quantity of ethyl mercury chloride utilized. Accordingly, 2-furylbenzimidazole cannot be considered a significant or particularly effective fungicide on the basis of the results with the various fungi tested yet ethyl mercury chloride would be considered a significant and effective fungicide generally.

EXAMPLE 2

Seed dressing test/wheat smut

To produce a suitable dry dressing, the active compound is extended with a mixture of equal parts by weight of talc and kieselguhr to give a finely powdered mixture having the desired concentration of the active compound.

Wheat seed is contaminated with 5 g. of chlamydospores of *Tilletia tritici* per kg. of seed. To apply the dressing, the seed is shaken in a closed glass flask with 1 g. of the dry dressing per kg. of seed. The seed is placed on the moist loam under a cover composed of a layer of muslin and 2 cm. of moderately moist compost soil and kept for 10 days in a refrigerator at 10° C. under optimum germination conditions for the spores.

This germination of the spores on the wheat grains, each of which is contaminated with about 100,000 spores, is subsequently determined microscopically. Obviously, the smaller the number of spores which have germinated, the more effective is the active compound.

The active compounds, their concentrations and the germination inhibition can be seen from Table 2 which follows:

TABLE 2.—SEED DRESSING TEST/WHEAT SMUT

| Active compound | Concentration of active compound [1] | Germination inhibition |
|---|---|---|
| Untreated control | 0 | No inhibition. |
| 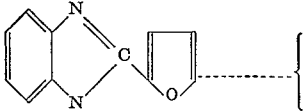 | 2.5<br>5<br>15 | Do.<br>Almost no inhibition.<br>Complete inhibition. |
| $C_2H_5$—Hg—Cl, (standard agent) | 1 | Do. |
| Mixture of 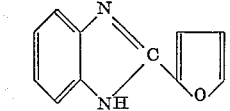 and hexachlorobenzene | 1<br>20 | Do. |
| Mixture of 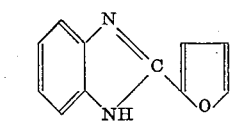 and pentachloronitrobenzene | 3<br>20 | Do. |

[1] In percent wt./wt. in the dressing agent.

As may be seen from Table 2, complete inhibition of spore germination it attained with a 15% concentration of the active compound 2-furyl-benzimidazole as opposed to complete inhibition using a 1% concentration of ethyl mercury chloride, a standard agent. With 2-furyl-benzimidazole at 2.5% concentration, no inhibition occurs and almost no inhibition occurs at a concentration of 5% thereof. This establishes that ethyl mercury chloride far exceeds other agents including 2-furyl-benzimidazole in potency as a fungicide generally in the same way as established in connection with the results of Table 1, considering the concentration of the particular compound being used. With a mixture of 1% of 2-furyl-benzimidazole and 20% of hexachlorobenzene, complete inhibition occurs and the same is true with a mixture of 3% of 2-furyl-benzimidazole and 20% of pentachloronitrobenzene. Obviously, the complete inhibition in the case of these mixtures is due to the presence of the hexachlorobenzene and pentachloronitrobenzene, respectively, since complete inhibition using 2-furylbenzimidazole is only attained at a high concentration of 15%. Table 2 establishes that 2-furyl-benzimidazole is compatible with other active compounds and at particular concentrations of the mixture ingredients, complete inhibition of spore germination occurs. Nevertheless, the results of Table 2 like the results of Table 1 establish the art accepted recognition of the effectiveness and potency of organic mercury compounds as fungicides and the low fungitoxic activity of 2-furyl-benzimidazole.

EXAMPLE 3

Seed dressing test/stripe disease of barley

To produce a suitable dry dressing, the active compound is extended with a mixture of equal parts by weight of talc and kieselguhr to give a finely powdered mixture having the desired concentration of active compound.

To apply the dressing, barley seed, which is naturally infested by *Helminthosporium gramineum*, is shaken in a closed glass flask with 2 g. of the dry dressing per kg. of seed. The seed is placed on moist filter paper discs in closed petri dishes and kept in a refrigerator for 10 days at a temperature of 4° C. The germination is thereby initiated. Two batches of 50 grains of the pre-germinated barley are subsequently sown 2 cm. deep in Fruhstorfer stand soil and cultivated in a greenhouse at temperatures of about 18° C. in seed boxes which are exposed to light for 16 hours daily. Within 3 to 4 weeks, the typical symptoms of the stripe disease develop on the leaves of the young barley plants.

After this time, the number of diseased plants is determined, by counting, as a percentage of the total number of emerged plants. The smaller the number of diseased plants, the more effective is the active compound.

The active compounds, their concentrations and the number of stripe—diseased plants can be seen from the following Table 3:

TABLE 3.—SEED DRESSING TEST/STRIPE DISEASE IN BARLEY

| Active compound | Concentration of active compound [1] in percent wt./wt. in the dressing agent | Number of stripe diseased plants in percent of total number of emerged plants |
|---|---|---|
| Untreated control | 0 | 28.2 |
| $C_2H_5$—Hg—Cl, (standard agent) | 1 | 0.0 |
| 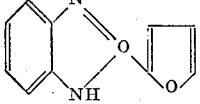 | 30 | 9.5 |

It will be seen from Table 3 that while ethyl mercury chloride causes complete inhibition of disease in the barely tested at only a 1% concentration, as compared with the untreated control, 2-furyl-benzimidazole in a cencentration of 30% only leads to a decrease of about 66% in the number of diseased plants as compared with the control. Thus, to attain even partial fungicidal effect, a 30 fold increase in the quantity of 2-furyl-benzimidazole must be used over the amount of the corresponding organic mercury compound. The results of Table 3 when considered cumulatively with those of Tables 1 and 2 reaffirm the general recognition that organic mercury compounds are strong fungicides and that in particular 2-furyl-benzimidazole is a comparatively weak and poorly effective fungicide.

EXAMPLE 4

Seed dressing test/snow mold

To produce a suitable dry dressing, the active compound is extended with a mixture of equal parts by weight of talc and kieselguhr to give a finely powdered mixture having the desired concentration of active compound.

To apply the dressing, rye seed which is naturally infested by *Fusarium nivale*, is shaken in a closed glass flask with 2 g. of dressing per kg. of seed. Two batches of 100 grains of the seed are shown 1 cm. deep in seed boxes containing compost soil. The young plants develop in climate chambers at 10° C., at a relative atmospheric humidity of 95% and in diffuse daylight. These plants show the typical symptoms of snow mold within the first 3 weeks.

After this time, the number of Fusarium-infested plants is determined, by counting, as a percentage of the total number of emerged plants. The smaller the number of diseased plants, of course, the more effective is the active compound.

The active compounds, their concentrations and the number of diseased plants can be seen from Table 4 as follows:

TABLE 4.—SEED DRESSING AGENT TEST/SNOW MOLD

| Active compound | Concentration of active compound in percent wt./wt. in the dressing agent | Number of fusarious plants in percent of the total number of emerged plants |
|---|---|---|
| Untreated control | 0 | 19.5 |
| Methoxyethyl mercurisilicate, (standard agent) | 5 | 0.6 |
| 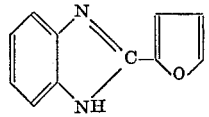 | 0.3<br>1.0<br>3.0 | 6.9<br>0<br>0 |
| Mixture of 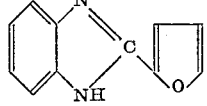 and hexachlorobenzene | 1.0<br><br>20.0 | 0 |
| Mixture of 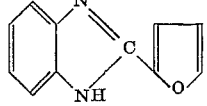 and hexachlorobenzene | 3.0<br><br>20.0 | 0 |
| Hexachlorobenzene (control agent) | 20.0 | 18. |

As may be seen from Table 4, the known agent methoxyethyl mercuri-silicate, which possesses high mammalian toxicity, causes almost complete inhibition of snow mold at a concentration of 5% as compared with the untreated control. On the other hand, 2-furyl-benzimidazole in accordance with the present invention is active in concentrations of 1% and 3% respectively to inhibit snow mold, with a concentration of only 0.3% causing inhibition which is reduced by about two-thirds as compared with the untreated control. Indeed, using 2-furyl-benzimidazole for inhibiting snow mold is advantageous over the use of methoxyethyl mercuri-silicate, not only in terms of the avoidance of high mammalian toxicity as an attendant problem but also in the actual quantities of the active compound used. The results of Table 4 show that as to snow mold 2-furyl-benzimidazole is even more effective than a corresponding mercury compound and, therefore, a double improvement is provided with regard to the comparatively low mammalian toxicity and the higher potency of the product in question. Complete inhibition is also attained with mixtures of 2-furyl benzimidazole and hexachlorobenzene and this emphasizes the compatibility of 2-furyl-benzimidazole with other active compounds usable for broadening the fungicidal spectrum. In terms of the control provided by the use of hexachlorobenzene alone, it is seen that the mixture of such known active compound with 2-furyl-benzimidazole for the instant purposes leads to effective results, establishing completely the compatibility of the mixture components and the mutually advantageous utilization of such components together.

EXAMPLE 5

Seed dressing test/soil-born fungus diseases

To produce a suitable dry dressing, the active compound is extended with a mixture of equal parts by weight of talc and kieselguhr to give a finely prowdered mixture having the desired concentration of active compound.

To apply the dressing, wrinkled peas are shaken with the dry dressing in a closed glass flask. Five batches of 10 grains are sown in pots which contain Fruhstorfer standard soil which is first sterilized and subsequently inoculated with a pure culture of *Fusarium culmorum*. In the experiments, temperatures between 22 and 25° C. are maintained. All pots are kept normally moist.

Three weeks after sowing, the number of healthy plants is determined as a percentage of the seeds sown. 0% means that no healthy plants have grown and 100% means that a healthy plant has resulted from every seed.

The active compounds, their concentrations in the dressing, the amounts of dressing used and the number of healthy plants can be seen from Table 5 as follows:

TABLE 5.—SEED DRESSING TEST/SOIL-BORN FUNGUS DISEASES

| Active compound | Concentration of active compound in percent wt./wt. in the dressing agent | Amount of dressing agent used in g./kg. seed | Number of healthy plants in percent from 100 seeds |
|---|---|---|---|
| Sterilized soil, untreated control | 0 | 0 | 86 |
| Infested soil | | | |
| Untreated control | 0 | 0 | 0 |
| 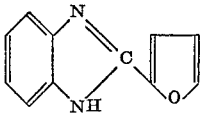 | 1<br>5 | 2<br>2 | 14<br>86 |

From Table 5 it is clear that 2-furyl-benzimidazole is effective to rid the soil of fungi of the type in question. Thus, used in a concentration of 1%, 2-furyl-benzimidazole is only partially effective whereas when used in a concentration of 5% the number of healthy plants is comparable with that in an untreated control in sterilized soil. On the other hand, in infested soil, the untreated control exhibited no healthy plants at all. This demonstrates that in an infested soil, the use of 2-furyl-benzimidazole in concentrations of only 5% leads to results comparable with those in which fungus is absent altogether from the soil in question.

Accordingly, the present invention is directed to a new use for a known compound and to compositions of such known compound rendered useful and appropriate only by dint of the newly discovered use. Hence, fungicidal compositions may now be provided which comprise a carrier vehicle, such as a dispersible liquid or dispersible solid, in admixture with 2-furyl-benzimidazole, with the latter generally being present in an amount substantially between about 0.1–95% by weight of the mixture, and preferably 0.5–90% by weight thereof, the amount of the 2-furyl-benzimidazole present being sufficient to combat phytopathogenic fungi of the genus Fusarium. Advantageously, in this connection, a method of combating phytopathogenic fungi of the genus Fusarium is provided, which comprises applying to such fungi and their habitat a fungicidal amount of 2-furyl-benzimidazole, either alone or in admixture with a carrier vehicle, for example any concentration substantially between about 0.05 and 50% by weight, and preferably between about 0.1 and 20% by weight. The method of using the compound in question also contemplates dressing seeds against phytopathogenic fungi of the genus Fusarium, by applying to such seeds as a seed dressing a fungicidal amount of such 2-furyl-benzimidazole. Plant seeds dressed with 2-furyl-benzimidazole alone or in admixture with a carrier vehicle in the foregoing stated percentages, are also contemplated as embodiments of the present invention.

Generally, the active compound, 2-furyl-benzimidazole, may be used in concentrations between about 0.05 and 50% by weight, preferably between 0.1 and 20% by weight in the mixture with the carrier vehicle, or such compound may be utilized per se in the absence of a carrier vehicle. Such adjustments in percentage of the active compound in the mixture utilized may be carried out, as the artisan will appreciate, starting with a commercially prepared formulation, for example, in which the 2-furyl-benzimidazole is present in admixture with a dispersible carrier vehicle in an amount substantially between about 0.1–95% by weight of the mixture as noted above.

Dosage unit preparations of 2-furyl-benzimidazole may also be prepared advantageously for particular use as for example a dosage unit preparation of 2 grams, of a mixture of at least 5% by weight of the mixture of 2-furyl-benzimidazole, with the remainder of the mixture being a dispersible carrier vehicle therefor, per kilogram of seed to be dressed.

Thus, as demonstrated by the results of Tables 1, 2 and 3, particular organic mercury compounds are generally potent and effective in comparatively small quantities whereas 2-furyl-benzimidazole is much less effective as fungicide. Generally, 2-furyl-benzimidazole must be used in a high-fold increase amount over the amount of the corresponding organic mercury compound tested in order to attain similar results or in order to exhibit a significant approach to such results, if applied against phytopathogenic fungi other than those of the genus Fusarium. The artisan only aware of the fact that 2-furyl-benzimidazole may be used for the control of fungi which cause skin irritations and are known to be killed most easily by fungicides would never have used 2-furyl-benzimidazole to combat fungi diseases caused by fungi of the genus Fusarium, which are known to be extremely difficult to combat.

2-furyl-benzimidazole is completely compatible with other known agents having corresponding usefulness. Considering the distinct difference in mammalian toxicity as noted hereinabove between 2-furyl-benzimidazole and such organic mercury compounds and the significantly greater potency of such 2-furyl-benzimidazole as demonstrated in connection with the results of Table 4, and the absolute effect of 2-furyl-benzimidazole in connection with seed dressing of seeds used in a fungus infected soil as demonstrated in connection with the results of Table 5, it is quite clear that the use of 2-furyl-benzimidazole as a fungicide for combating phytopathogenic fungi of the genus Fusarium would not have been considered possible or advisable and the observance provided in accordance with the present invention in this regard represents a completely surprising discovery totally without predictible basis in the prior art.

Hence, in accordance with the present invention, the instant 2-furyl-benzimidazole may be used in compatible mixtures with a member selected from the group consisting of hexachlorobenzene, hexachlorocyclohexane, and pentachloronitrobenzene, and mixtures thereof, whereby to combat phytopathogenic fungi of the genus Fusarium.

Also, in accordance with another alternate feature of the present invention, the instant 2-furyl-benzimizadole may be used in dosage unit form in admixture with a dispersible carrier vehicle as for example to provide a seed dressing composition, usable in amounts of 2 grams per kilogram of seeds to be dressed, with the 2-furyl-benzimidazole being present in the mixture in an amount of at least about 5% by weight thereof, the remainder being the carrier vehicle. More particularly, if desired, the fungicidal preparation may take the form of a dosage unit preparation containing 2-furyl-benzimidazole per se in an amount of at least about 0.01 gram per kilogram of seeds to be dressed.

It will be appreciated that the instant specification and examples are set forth by way of illustration, and not limitation, and that various modifications and changes may be made without departing from the spirit and scope of the present invention which is to be limited only by the scope of the appended claims.

What is claimed is:
1. Fungicidal composition which consists of a plant-compatible mixture of a dispersible carrier vehicle selected from the group consisting of (1) a dispersible carrier liquid containing a member selected from the group consisting of non-ionic emulsifying agents, anionic emulsifying agents and dispersing agents, and (2) a dispersible finely divided carrier solid containing a member selected from the group consisting of non-ionic emulsifying agents, anionic emulsifying agents and dispersing agents, with a fungicidally effective amount, constituting substantially between about 0.1–95% by weight of the mixture and sufficient to combat phytopathogenic fungi of the genus Fusarium, of 2-furyl-benzimidazole having the formula

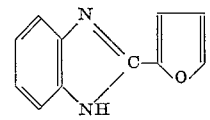

2. Composition according to claim 1 wherein said carrier vehicle is a dispersible carrier liquid containing such member and said 2-furyl-benzimidazole constitutes substantially between about 0.05–50% by weight of the mixture.

3. Composition according to claim 1 wherein said carrier vehicle is a dispersible carrier solid containing such members and said 2-furyl-benzimidazole constitutes substantially between about 0.05–50% by weight of the mixture.

4. Fungicidal composition which consists essentially of a plant-compatible mixture of a dispersible carrier solid containing a member selected from the group consisting of non-ionic emulsifying agents, anionic emulsifying agents, dispersing agents, and mixtures of such agents, a compatible member selected from the group consisting of hexachlorobenzene, hexachlorocyclohexane, pentachloronitrobenzene, and mixtures of said members, and a fungicidally effective amount, constituting substantially between about 0.1–95% by weight of the mixture and sufficient to combat phytopathogenic fungi of the genus Fusarium, of 2-furyl-benzimidazole having the formula

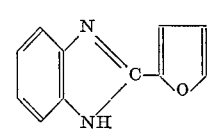

5. Composition according to claim 3 wherein said mixture is in the form of a fungicidal seed dressing dosage unit preparation constituting at least 0.01 gram per kilogram of seeds to be dressed.

6. Composition according to claim 3 wherein said mixture is in the form of a fungicidal seed dressing dosage unit preparation constituting at least 2 grams per kilogram of seeds to be dressed, with said 2-furyl-benzimidazole being present in the preparation in a fungicidally effective amount of at least about 5% by weight thereof.

7. Fungicidal composition which comprises a fungicidal mixture of a member selected from the group consisting of hexachlorobenzene, hexachlorocyclohexane, pentachloronitrobenzene, and mixtures of such members, with substantially between about 0.1–95% by weight of the fungicidal mixture of 2-furyl-benzimidazole, said fungicidal mixture being compatible and sufficient to combat phytopathogenic fungi of the genus Fusarium.

8. Fungicidal composition which consists essentially of a fungicidal mixture of a member selected from the group consisting of hexachlorobenzene, hexachlorocyclohexane, pentachloronitrobenzene, and mixtures of such members, with substantially between about 0.05–50% by weight of the fungicidal mixture of 2-furyl-benzimidazole, said fungicidal mixture being compatible and sufficient to combat phytopathogenic fungi of the genus Fusarium.

9. Plant seeds dressed with a coating of a fungicidal seed dressing composition which consists essentially of a mixture of a dispersible carrier vehicle selected from the group consisting of (1) a dispersible carrier liquid containing a member selected from the group consisting of non-ionic emulsifying agents, anionic emulsifying agents, dispersing agents, and mixtures of such agents, and (2) a dispersible finely divided carrier solid containing a member selected from the group consisting of non-ionic emulsifying agents, anionic emulsifying agents, dispersing agents, and mixtures of such agents, with a fungicidally effective amount, constituting substantially between about 0.1–95% by weight of the mixture and sufficient to combat phytopathogenic fungi of the genus Fusarium, of 2-furyl-benzimidazole having the formula

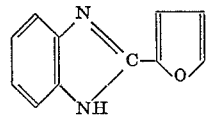

10. Plant seeds dressed according to claim 9 wherein said carrier vehicle is a dispersible carrier liquid containing such member and said 2-furyl-benzimidazole constitutes substantially between about 0.05–50% by weight of the mixture.

11. Plant seeds dressed according to claim 9 wherein said carrier vehicle is a dispersible carrier solid containing such member and said 2-furyl-benzimidazole constitutes substantially between about 0.05–50% by weight of the mixture.

12. Plant seeds dressed according to claim 11 wherein said mixture is present in an amount of at least 0.01 gram per kilogram of seeds.

13. Plant seeds dressed according to claim 11 wherein said mixture is present in an amount of at least 2 grams per kilogram of seeds to be dressed, with said 2-furylbenzimidazole being present in the preparation in a fungicidally effective amount of at least about 5% by weight thereof.

14. Plant seeds dressed with a coating of a fungicidal seed dressing composition which comprises a fungicidal mixture of a member selected from the group consisting of hexachlorobenzene, hexachlorocyclohexane, pentachloronitrobenzene, and mixtures of such members, with substantially between about 0.1–95% by weight of the fungicidal mixture of 2-furylbenzimidazole, said fungicidal mixture being compatible and sufficient to combat phytopathogenic fungi of the genus Fusarium.

15. Plant seeds dressed with a coating of a fungicidal seed dressing composition which consists essentially of a fungicidal mixture of a member selected from the group consisting of hexachlorobenzene, hexachlorocyclohexane, pentachloronitrobenzene, and mixtures of such members, with substantially between about 0.05–50% by weight of the fungicidal mixture of 2-furyl-benzimidazole, said fungicidal mixture being compatible and sufficient to combat phytopathogenic fungi of the genus Fusarium.

16. Plant seeds dressed with a coating of a fungicidally effective amount of 2-furyl-benzimidazole having the formula

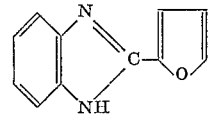

17. Plant seeds dressed according to claim 16 wherein the coating of said 2-furyl-benzimidazole is in the form of a mixture with a dispersible carrier vehicle, said 2-furyl-benzimidazole constituting substantially between about 0.05–50% by weight of the mixture.

18. Method of combating phytopathogenic fungi of the genus Fusarium, which comprises applying to at least one of (a) such fungi, (b) soil, (c) plants, and (d) seeds, a fungicidally effective amount of 2-furyl-benzimidazole having the formula

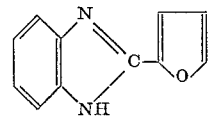

19. Method according to claim 18 wherein said 2-furyl-benzimidazole is applied in the form of a mixture with a dispersible carrier vehicle, said 2-furyl-benzimidazole constituting substantially between about 0.05–50% by weight of the mixture.

20. Method according to claim 19 wherein said 2-furyl-benzimidazole constitutes substantially between about 0.1–20% by weight of the mixture.

21. Method according to claim 24 wherein said carrier vehicle is a dispersible liquid.

22. Method according to claim 24 wherein said carrier vehicle is a dispersible finely divided solid.

23. Method according to claim 24 wherein said carrier vehicle contains a member selected from the group consisting of non-ionic emulsifying agents, anionic emulsifying agents, dispersing agents, and mixtures of such agents.

24. Method of dressing seeds against phytopathogenic fungi of the genus Fusarium which comprises applying to such seeds as a seed dressing a fungicidally effective amount of 2-furyl-benzimidazole having the formula

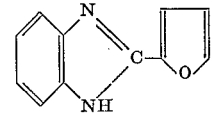

25. Method according to claim 24 wherein said 2-furylbenzimidazole is applied in the form of a mixture with a dispersible carrier vehicle, said 2-furyl-benzimidazole constituting substantially between about 0.05–50% by weight of the mixture.

26. Method according to claim 24 wherein said 2-furylbenzimidazole constitutes substantially between about 0.1–20% by weight of the mixture.

27. Method according to claim 24 wherein said carrier vehicle is a dispersible liquid.

28. Method according to claim 24 wherein said carrier vehicle is a dispersible finely divided solid.

29. Method according to claim 24 wherein said carrier vehicle contains a member selected from the group consisting of non-ionic emulsifying agents, anionic emulsifying agents, dispersing agents, and mixtures of such agents.

References Cited

UNITED STATES PATENTS 1,947,926  2/1934  Steindorff et al. _____ 167—38

FOREIGN PATENTS 25,244  3/1956  Germany.
25,244  3/1956  Germany _____ 167—33D
606,578  8/1948  Great Britain _____ 167—38
1,117,000  11/1961  Germany _____ 167—33B

OTHER REFERENCES

Stedman's Medical Dictionary, 17th ed. (1949), p. 465.

STANLEY J. FRIEDMAN, Primary Examiner

U.S. Cl. X.R.

424—273

PO-1050
(5/69)

UNITED STATES PATENT OFFICE
CERTIFICATE OF CORRECTION

Patent No. 3546813          Dated December 15, 1970

Inventor(s) Paul-Ernst Frohberger and Christian Wiegand

It is certified that error appears in the above-identified patent and that said Letters Patent are hereby corrected as shown below:

Col. 1, line 25, "fung" should be -- fungi --

Col. 1, line 36, after "same" insert -- is --

Col. 2, line 48, "definely" should be -- definitely --

Col. 5, first formula

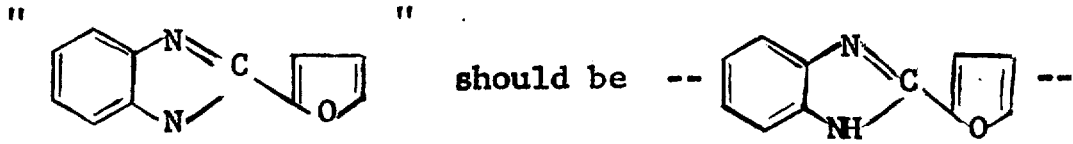

Col. 5, line 70, "it" should be -- is --

Col. 6, line 67, "barely" should be -- barley --

Col. 7, Table 4, last figure in last column: "18." should be -- 18.5 --

Col. 10, claim 3, line 50, "members" should be -- member --

Signed and sealed this 30th day of March 1971.

(SEAL)
Attest:

EDWARD M. FLETCHER, JR.          WILLIAM E. SCHUYLER, JR.
Attesting Officer                Commissioner of Patents